No. 728,466. PATENTED MAY 19, 1903.
W. D. HUSE.
FRICTION PULLEY OR WHEEL.
APPLICATION FILED OCT. 16, 1901.
NO MODEL.
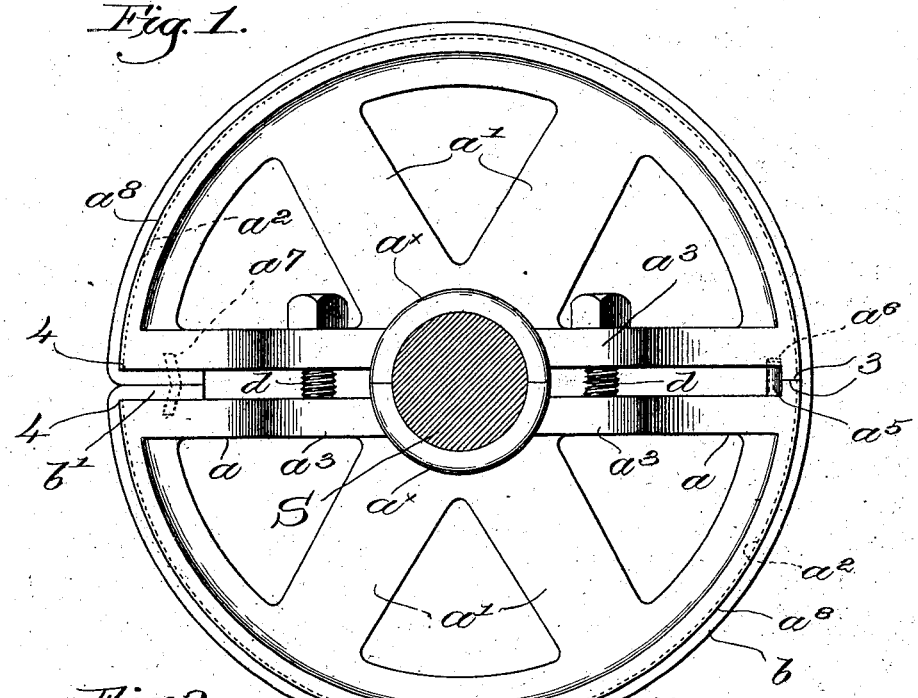
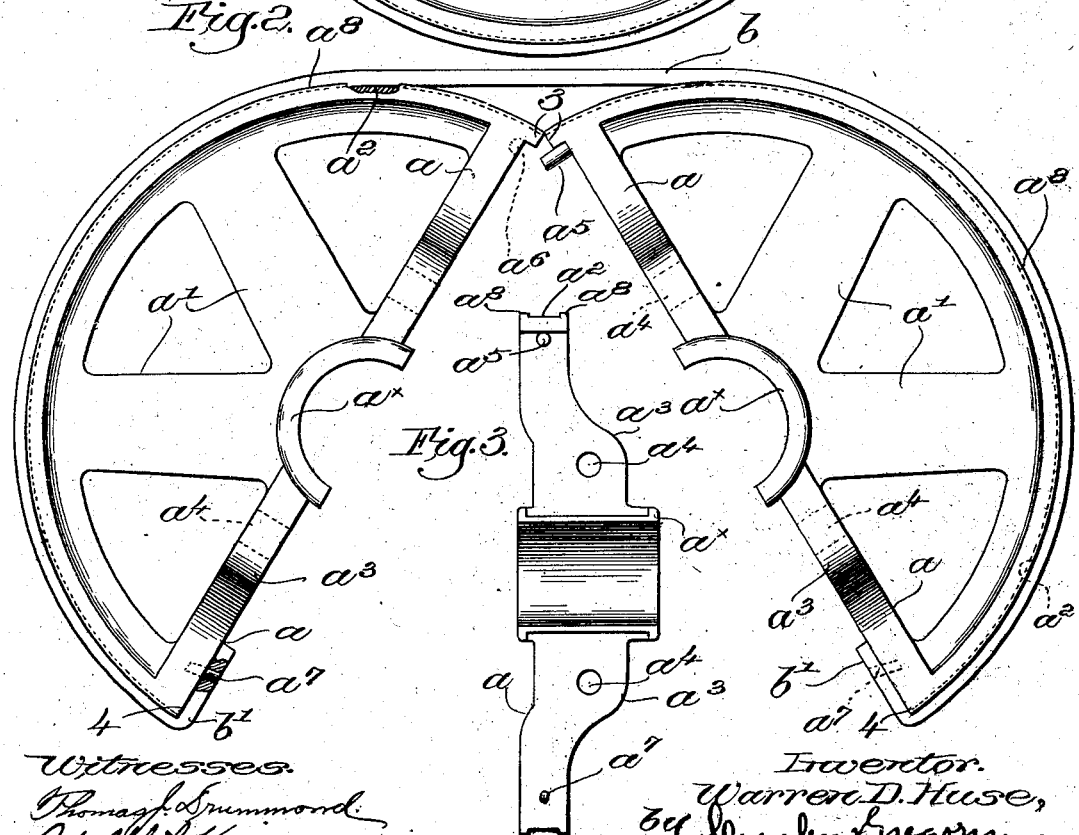
Witnesses
Thomas J. Drummond
Adolph H. Kaiser
Inventor.
Warren D. Huse,
by Crosby & Gregory
Attys.

No. 728,466. Patented May 19, 1903.

UNITED STATES PATENT OFFICE.

WARREN D. HUSE, OF LACONIA, NEW HAMPSHIRE, ASSIGNOR OF TWO-THIRDS TO LEON C. HUSE AND WALTER L. HUSE, OF LACONIA, NEW HAMPSHIRE.

FRICTION PULLEY OR WHEEL.

SPECIFICATION forming part of Letters Patent No. 728,466, dated May 19, 1903.

Application filed October 16, 1901. Serial No. 78,772. (No model.)

*To all whom it may concern:*

Be it known that I, WARREN D. HUSE, a citizen of the United States, and a resident of Laconia, county of Belknap, State of New Hampshire, have invented an Improvement in Friction Pulleys or Wheels, of which the following description, in connection with the accompanying drawings, is a specification, like characters on the drawings representing like parts.

This invention has for its object the production of a novel friction pulley or wheel which may be readily applied to or removed from a shaft or other rotatable member and which has a friction band or member secured in place in a novel and effective manner.

Heretofore friction-pulleys have been provided with a friction-band held in place by cement, glue, nails, &c., upon the rim of the pulley, or the band has been connected at its ends previous to being forced upon the rim to be held thereupon frictionally. Such constructions are objectionable, however, as they are short-lived, the friction-band soon working loose, and, moreover, the pulley cannot be applied to its shaft or removed therefrom without considerable trouble and by the expenditure of time.

In accordance with my invention I have provided a split pulley or wheel which is readily applied or detached, and the friction-band is secured in place upon the pulley-rim in such manner that it is subjected to tensile strain, and consequently is maintained taut or smooth without the use of cement or glue and obviating nails or prongs in the curved face or rim of the pulley.

Figure 1 is a side elevation of a friction pulley or wheel embodying one form of my invention shown in operative position clamped upon a shaft. Fig. 2 is a similar view showing the half-sections of the pulley open ready to be applied to a shaft or other rotatable support; and Fig. 3 is an inner face view of one of the sections, on a smaller scale.

In accordance with my invention the pulley or wheel comprises two separable half-sections, each consisting of a half-hub $a^x$, arms or spokes $a$ $a'$, and substantially semi-circular rims $a^2$, the spokes $a$, which extend oppositely from the hub, having bosses or lateral enlargements $a^3$, (see Fig. 3,) provided with threaded holes $a^4$. The ends 3 of the rims project beyond the adjacent arms $a$ and are adapted to abut against each other when the half-sections are closed, as in Fig. 1, while the opposite ends of the rims, as 4, are separated somewhat, as clearly shown in Fig. 1, for a purpose to be described. A lug $a^5$ projects from the inner face of an arm $a$ of one section adjacent the end 3 of its rim to enter a corresponding socket $a^6$ in the inner face of the opposite arm $a$ of the other section, forming a species of open or separable hinge-joint, which serves to position the two sections when they are being closed together. The oppositely-extended arm $a'$ of each section has projecting from its inner face near the end 4 of its rim a band-holding prong $a^7$, and preferably the prongs are slightly inclined away from the curved face of the pulley. A flexible friction-band $b$, of leather, rawhide, or other suitable material, is carried around the two rims $a^2$ and turned in at its ends over the ends 4 of the rims, the inturned ends $b'$ of the band being engaged by the prongs $a^7$, as clearly shown in the drawings, so that the band is securely held at its ends. When the band is applied, the half-sections being open, as in Fig. 2, its length, measured between the turned-over ends, is somewhat less than the combined length of the outer faces of the two rims $a^2$, so that when the sections are closed the band will be subjected to tensile strain, and it will be held under tension firmly upon the pulley-rim without any additional fastening means, such as cement, glue, &c. By this construction I obtain a smooth taut friction-surface for the pulley, and as the band is attached only at its ends to the sections the band will not pinch or become distorted when the sections are separated.

I prefer to provide the rims with a shallow flange or lip $a^8$ at each edge (see Fig. 3) to prevent any possible side slip of the band and to position it when closing the sections, the band being thick enough to project beyond the tops of the flanges.

Bolts $d$ are screwed into the threaded holes of the bosses $a^3$ to hold the half-sections together and clamped upon a shaft or other rotatable support S, as in Fig. 1, and by referring to said figure it will be seen that the space separating the ends 4 of the rims accommodates the inturned ends $b'$ of the band. When the band stretches enough to become loose, the sections are opened and the band shortened by taking it up and causing a fresh engagement with one or both of the holding-prongs.

Having fully described my invention, what I claim as new, and desire to secure by Letters Patent, is—

1. A friction pulley or wheel comprising two half-sections each having a substantially semicircular rim, a flexible non-metallic friction-band surrounding the rims and secured at its ends to said sections, the rim-inclosing portion of the band when applied to the separated sections being shorter than the combined length of the rims, whereby the band is stretched by closing the sections, and maintained under tension thereupon, and means to maintain the sections closed.

2. A friction pulley or wheel comprising two half-sections each having a substantially semicircular rim, the rims being separated at one end and abutting at their other ends when the sections are closed, a flexible one-piece friction-band surrounding the rims and having its two ends inturned between the separated ends of the rims, means to enter and secure the superposed ends of the band to the respective sections, and separate detachable means to maintain the sections closed.

3. A friction pulley or wheel comprising two half-sections each having a substantially semicircular rim, the rims being separated at one end and abutting at their other ends when the sections are closed, a projection on the inner face of one section, to enter a recess in the opposed face of the other section, adjacent the abutting ends of the rims, holding-prongs on the opposed inner faces of the sections adjacent the other ends of the rims, a flexible friction-band surrounding the rims, inturned at its ends between the separated ends of the rims and forced upon the holding-prongs, and means to hold the sections closed.

4. A friction pulley or wheel comprising two half-sections each having a substantially semicircular rim, a flexible, non-metallic one-piece friction-band surrounding the rims and having its rim-inclosing portion primarily shorter than the combined length of the rims, means on the sections and accessible when the sections are open, to positively engage and secure the ends of the band to the respective sections, and means to maintain the sections closed with the ends of the band superposed one upon the other, the band being held under tension when the sections are closed.

5. A friction pulley or wheel comprising two separable half-sections each having a substantially semicircular rim adapted to abut at one end when the sections are closed, and separated at their other ends, a flexible friction-band surrounding the rims and having its ends inturned at the separated ends of the rims, means carried by the separated ends of the half-sections to engage and secure the ends of the band to said sections, and separate means to hold the sections together, the rim-inclosing portion of the band when applied being shorter than the combined length of the rims, whereby the band is pulled taut and held under tension when the sections are closed.

6. A friction pulley or wheel comprising two separable half-sections each having a substantially semicircular rim adapted to abut at one end when the sections are closed, and separated at their other ends, a half-hub forming a part of each section, a separable positioning-joint adjacent the abutting ends of the rims, holding-prongs on the opposed inner portions of the sections adjacent the other ends of the rims, a flexible non-metallic band surrounding the rims and inturned at its ends to engage the holding-prongs when the sections are open, and bolts to maintain the sections together with the band held upon the rims under tension, the opposing inner portions of the sections maintaining the inturned ends of the band upon the prongs.

In testimony whereof I have signed my name to this specification in the presence of two subscribing witnesses.

WARREN D. HUSE.

Witnesses:
GEO. P. MUNSEY,
BLANCHE TETLEY.